UNITED STATES PATENT OFFICE.

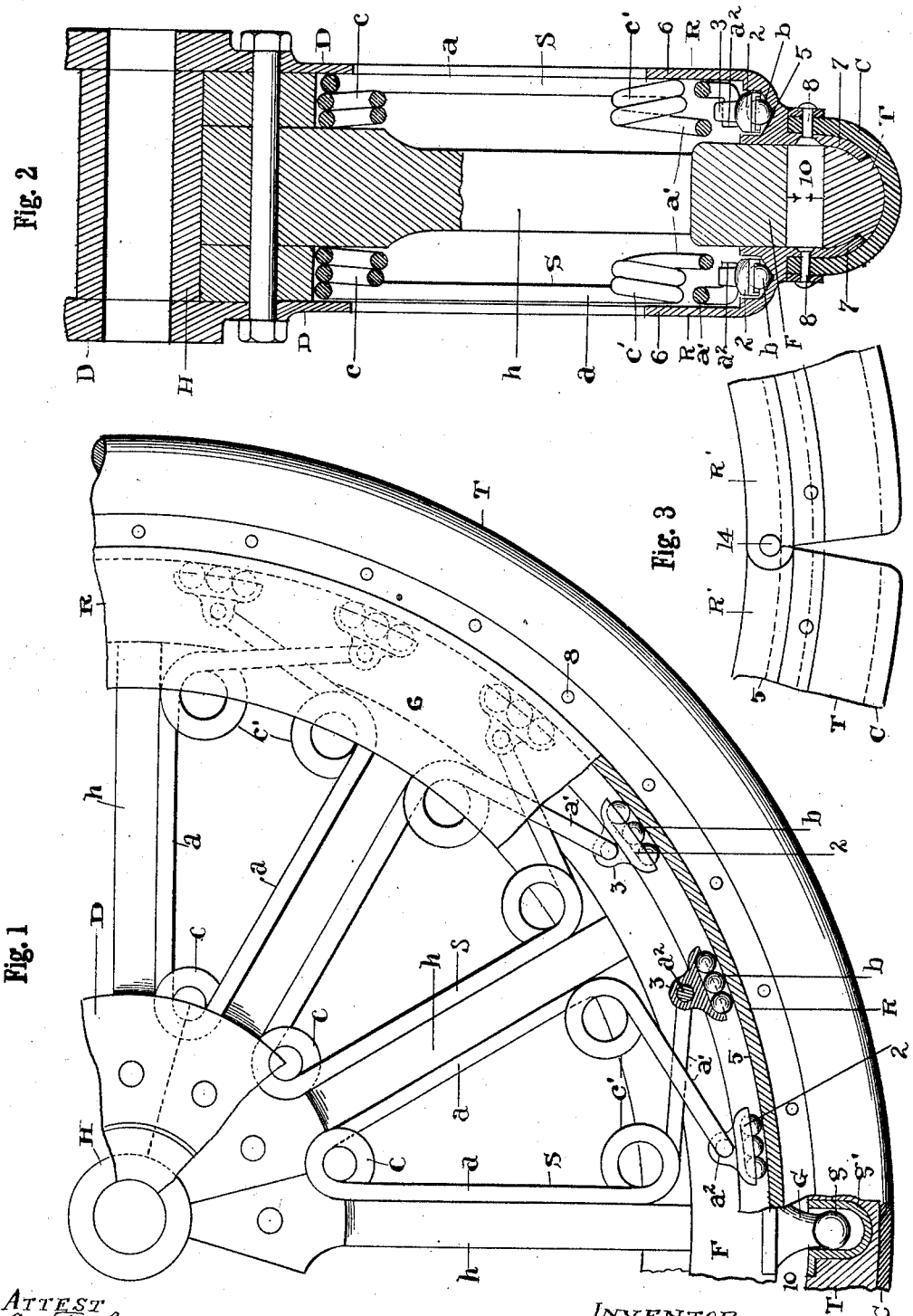

EMIL G. GLASER, OF NORTH DOVER, OHIO.

SPRING-WHEEL.

1,003,596. Specification of Letters Patent. Patented Sept. 19, 1911.

Application filed April 8, 1911. Serial No. 619,648.

*To all whom it may concern:*

Be it known that I, EMIL G. GLASER, citizen of the United States, residing at North Dover, in the county of Cuyahoga and State of Ohio, have invented certain new and useful Improvements in Spring-Wheels, of which the following is a specification.

This invention relates to an improvement in spring wheels.

In the accompanying drawings, Figure 1 is a side elevation of a portion of a wheel containing my improvement, and Fig. 2 is a cross section thereof. Fig. 3 is a side view of a modification of one of the side rims.

The idea in this invention is to meet the needs of resiliency in an automobile tire by means of an original construction and arrangement of wire springs which are intended to provide a complete and satisfactory substitute for pneumatic tires, thus permitting a solid and non-puncturable tire tread to be used along with rims and other parts which together make up a thoroughly good and acceptable cushioned tire construction. To these ends I show portions of a wheel having a suitable hub H, radial spokes $h$, a felly F carried by said spokes, side rims or plates R of similar construction arranged on opposite sides of the felly, a tread or tire T and a felt, duck, or equivalent covering C over said tread.

In the present construction spokes and felly of wood are shown and constitute a complete wheel adapted to receive any preferred form of tire suitable to be used therewith. But since I am dispensing entirely with rubber in my improvement I come to the wheel with a series of wire springs S of suitable strength and yet adapted to afford such spring action as an automobile wheel requires to give it the desired resiliency and to absorb shock or impact from obstructions on the road. To these ends the said springs are each made in single and separate pieces from a suitable wire, being provided with coils $c$ of two or three windings at their middle and adapted to seat or abut in hub H between the spokes $h$ and at their sides between side disks D of the hub which partially overlap said coils $c$ outside and confine them laterally. The portions or sides $a$ of the spring diverge from coils $c$ in approximately V shape and are given another coil $c'$ at a point just within the felly F, relatively, and from this point the ends or extremities $a'$ extend inwardly at nearly or about right angles to the body portions $a$ thereof and cross in nearly X shape to opposite sides. This brings each end practically beneath or opposite the coil $c'$ of the other side of the spring, and the immediate ends $a^2$ of each stem or spring are bent at right angles in opposite directions and have shoes 2 pivotally mounted thereon. The said shoes have ears 3 on top in which the said extremities $a^2$ are loosely engaged and are further provided with elongated cavities or depressions on their bottom adapted in the present case to receive several antifriction balls $b$. The said shoes come at the sides of the felly and the side rims or plates R have inside annular approximately V shaped tracks 5 in which said balls ride or rest. The said rims necessarily have an original form of construction to provide a rest of this kind and to otherwise constitute the spring and load sustaining members of the organization. Thus, the said rims have flanges 6 rising outside from about the V shaped bearing 5 and extending inward toward the center of the wheel and partially overlapping the coils $c'$ on their outside, while each rim has an oppositely extending flange 7 on its inside adapted in part to bear against the side of the felly and having both flanges 7 curved inwardly somewhat toward each other at their edges and constituting a side grip and support between which the tire is operatively engaged. The actual tread portion of the tire is the outer flexible and durable wearing cover C which overlies the flanges 7 of the side rims and is secured thereto by short bolts or screws 8, at intervals about the same.

A space 10 is provided between felly F and tire T sufficient to give all the play the parts require under spring action however induced, whether by even running on the road or when obstructions are encountered. To this end the tire ring T is made as much greater in diameter or size than the felly as said space 10 indicates and this is the measure of spring movement anywhere about the wheel.

In order that the tire T and the wheel proper shall be locked together rotatively I provide the felly with an extension G in line with one of the several spokes $h$ and having a ball shaped extremity $g$ working in a socket $g'$ in the tire. This or equivalent interlocking of the tire with the wheel insures coöperation between said parts but leaves the tire free to respond to the action of the springs for cushioning effect, and the shoes 2 are distributed about the wheel in such numbers that they afford ample spring bearing for the tire. It follows of course that the springs S sustain the load, and each spring has particularly the coils $c'$ and stems $a'$ in such working relations that they will promptly respond to shock or impact upon the tire.

In Fig. 3 I show a modification of the side rims, the same being indicated by R' and shown as having a pivot joint 14, and practically omitting the flange 6 in its higher extension. The rim and tire may thus be divided into sections circumferentially about the felly of the wheel, and each section be engaged by one or more springs S.

What I claim is:

1. A vehicle wheel and a tire about the same, two series of wire springs seated in the hub of the wheel and disposed on opposite sides of the wheel, the said springs having transverse coils and straight middle portions and crossed extremities, and side rims having bearings for said springs and supporting said tire apart from the wheel.

2. A vehicle wheel having a suitable hub, spokes and felly, wire springs having coils resting on said hub and having arms provided each with a coil in its outer portion and straight extensions outside said coils crossed between said arms, and bearings at the sides of said felly for said springs and the said springs arranged in series at the sides of said wheel.

3. A vehicle wheel and a solid tire of greater diameter than the wheel about the same, in combination with cushioning means for the tire comprising two series of springs having coils resting against the hub of the wheel, and rims at each side having said springs seated therein and said rims engaging the tire between their outer portions, the said springs having transverse coils near their outer ends and the immediate ends thereof crossed and provided with bearing shoes resting in said rims.

4. A vehicle wheel having a tire of greater diameter than the wheel and free from the periphery thereof, in combination with supporting means for the tire comprising two series of wire springs on the sides of the wheel, said springs each bent at their middle and resting in the hub of the wheel and the outer ends of said springs having coils and crossed extremities and side rims in which each series of springs is engaged and having the said tire locked between their outer portions.

5. A vehicle wheel and a tire of larger diameter about the same, in combination with two series of springs having coils seated in the hub of the wheel and each spring having separate arms with coils in their outer portions and the extremities of said arms crossed, side rims having said tire secured between them and provided with annular channels, and shoes supported on the outer ends of said spring arms respectively and anti-friction balls therein riding in said channels.

In testimony whereof I affix my signature in presence of two witnesses.

EMIL G. GLASER.

Witnesses:
R. B. MOSER,
E. M. FISHER.

---

Copies of this patent may be obtained for five cents each, by addressing the "Commissioner of Patents, Washington, D. C."